(12) United States Patent
Wang et al.

(10) Patent No.: US 8,407,372 B2
(45) Date of Patent: Mar. 26, 2013

(54) DEVICE AND METHOD FOR DETECTING MOTHERBOARD VOLTAGE

(75) Inventors: Chun Wang, Shenzhen (CN); Xin-Xiang Li, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 657 days.

(21) Appl. No.: 12/651,149

(22) Filed: Dec. 31, 2009

(65) Prior Publication Data

US 2011/0047392 A1 Feb. 24, 2011

(30) Foreign Application Priority Data

Aug. 19, 2009 (CN) .......................... 2009 1 0305814

(51) Int. Cl.
*G06F 3/00* (2006.01)
*G06F 13/12* (2006.01)
*G06F 13/38* (2006.01)

(52) U.S. Cl. ................................. 710/10; 710/8; 710/65

(58) Field of Classification Search .................... 710/65, 710/8, 10

See application file for complete search history.

(56) References Cited

U.S. PATENT DOCUMENTS

| 4,837,811 A * | 6/1989 | Butler et al. ............... 379/93.17 |
| 2004/0196625 A1* | 10/2004 | Tseng et al. .................. 361/684 |
| 2005/0286193 A1* | 12/2005 | Alokby ........................ 361/93.1 |
| 2009/0199033 A1* | 8/2009 | Borkar et al. ................. 713/340 |

OTHER PUBLICATIONS

"How to Modify a Voltage Regulator Module for an Intel Pentium II", IBM Technical Disclosure Bulletin, NNRD41586, Nov. 1, 1998, vol. 1, Issue No. 415.*
"overclock.net CPU vid" Oct. 23, 2007, http://www.overclock.net/t/251112/cpu-vid.*
"Logic level—Wikipedia, the free encyclopedia", Jan. 28, 2008, http://web.archive.org/web/20080128214547/http://en.wikipedia.org/wiki/Logic_level.*

* cited by examiner

*Primary Examiner* — Farley Abad
(74) *Attorney, Agent, or Firm* — Altis Law Group, Inc.

(57) ABSTRACT

A voltage detecting device is provided to detect voltage value of a voltage identification (VID) module on a motherboard. The VID module has a plurality of VID module pins. The voltage detecting device includes a signal transforming module and a main control circuit. The signal transforming module is couple with the VID module. The main control circuit is connected to the signal transforming module. The main control circuit is capable of causing the signal transforming module to read voltage signal at each VID module pin, transforming each voltage signal to a group of binary data, decrypting each group of binary data to a corresponding binary level code, constructing a binary level code combination, and determining actual voltage value corresponding to the binary level code combination.

13 Claims, 3 Drawing Sheets

DEVICE AND METHOD FOR DETECTING MOTHERBOARD VOLTAGE

BACKGROUND

1. Technical Field

The present disclosure relates to detecting devices and methods, particularly, to a detecting device and a method for detecting voltage value of a Voltage Identification (VID) module on a motherboard.

2. Description of Related Art

A VID module is generally disposed on a motherboard to control CPU core voltage. During motherboard testing, CPU core voltage may be checked via measuring voltage output by the VID module with a multimeter. Manually connecting the multimeter is difficult and risky with the compact layout of circuit boards, and may easily cause short circuits and damage the motherboard. In addition, connections may be unstable during testing, thus decreasing testing accuracy.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

Figure 1:
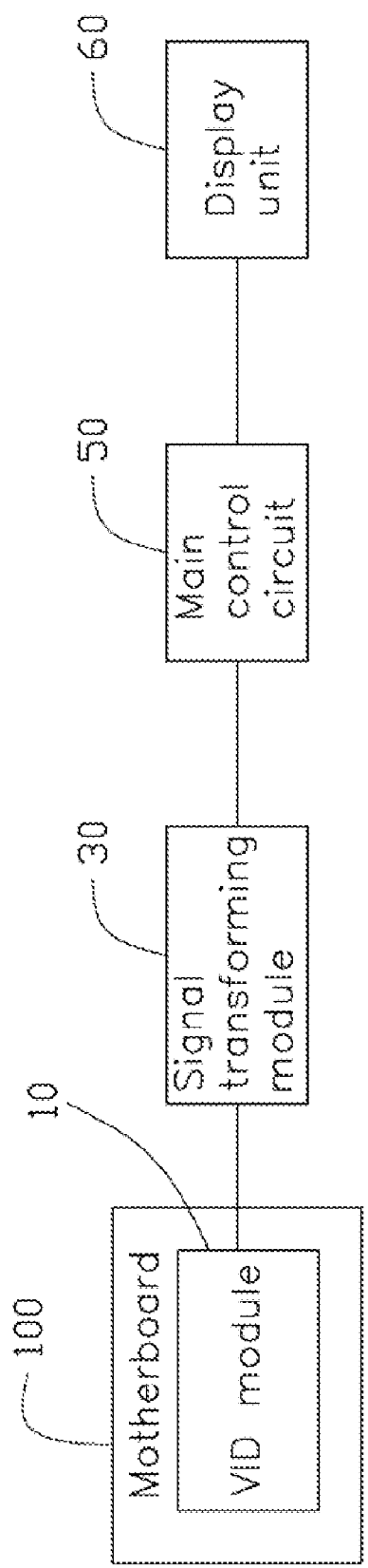
FIG. 1 is a block diagram of an embodiment of a detecting device for a VID module on a motherboard.

Referring to FIG. 1, an embodiment of a detecting device is provided for measuring voltage of a VID module 10 on a motherboard 100. The detecting device includes a signal transforming module 30, a main control circuit 50, and a display unit 60. The VID module 10 includes a plurality of VID module pins VID0-VID7 (see FIG. 2). The main control circuit 50 is connected to the signal transforming module 30 and the display unit 60. The main control circuit 50 is capable of causing the signal transforming module 30 to read voltage signals of the different VID module pins, transforming each voltage signal to a group of binary data, decrypting each group of binary data to a corresponding binary level code, and determining voltage value according to a binary level code combination defined by the groups of binary data. A group of reference binary data and a database are preset in the main control circuit 50. The database is defined by a set of voltage values and a set of reference binary level code combinations. Each reference binary level code combination corresponds to a voltage value. The group of reference binary data is configured for determining binary level codes corresponding to the voltage signals.

Figure 2:
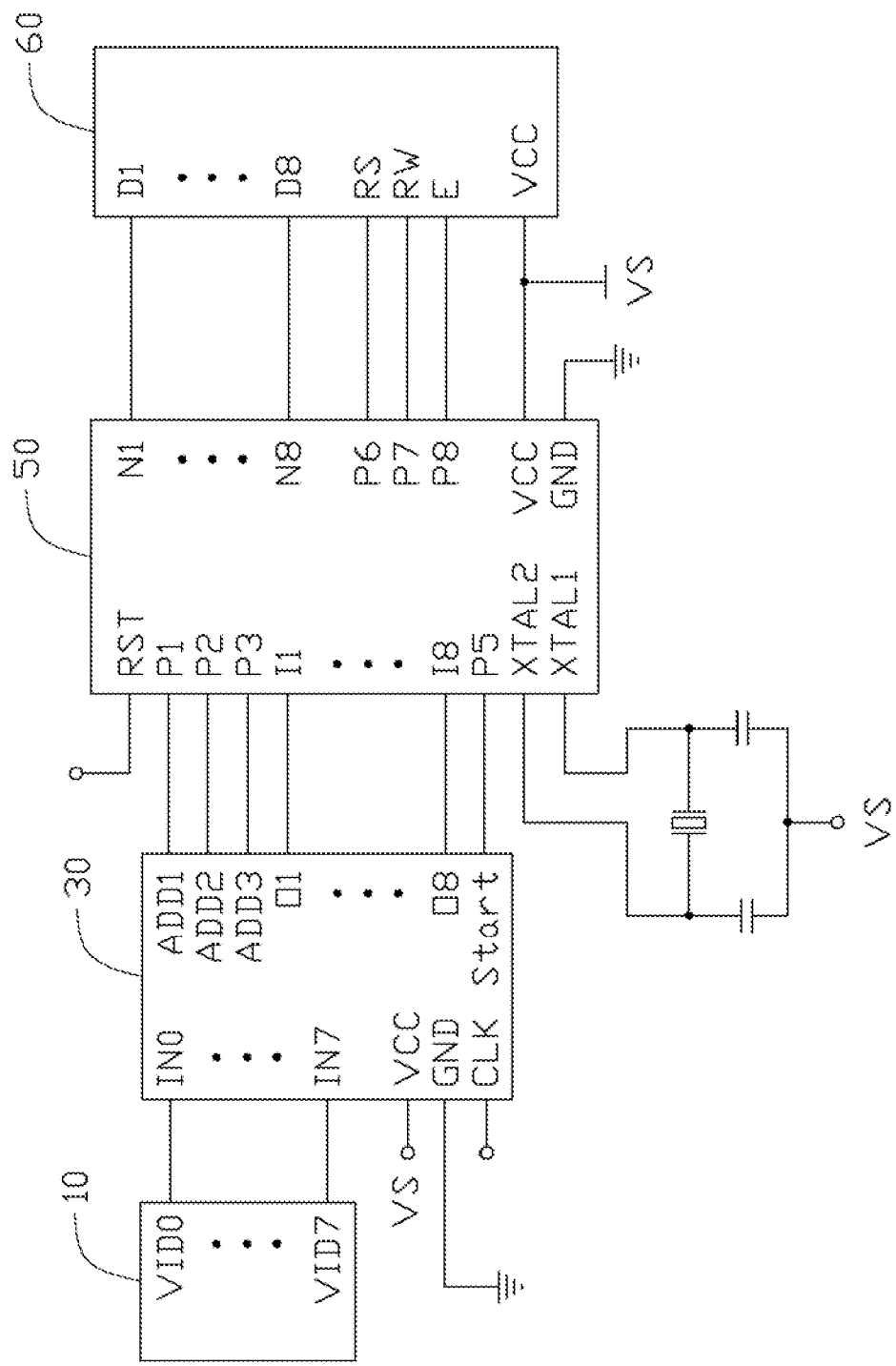
FIG. 2 is a circuit diagram of the detecting device of FIG. 1.

Referring to FIG. 2, the signal transforming module 30 includes a plurality of signal collecting pins IN0-IN7, a plurality of signal output pins O1-O8, a plurality of address pins ADD1-ADD3, a signal transforming pin Start, a clock pin CLK, a power source pin VCC1, and a ground pin GND1. The signal collecting pins IN0-IN7 are coupled to the VID module pins VID0-VID7 correspondingly so as to read a plurality of voltage signals from corresponding VID module pins VID0-VID7.

The main control circuit 50 includes a plurality of first data transmitting pins I1-I8 connected to the signal output pins O1-O8; a plurality of second data transmitting pins N1-N8; a plurality of control pins P1-P3 connected to the address pins ADD1-ADD3 of the signal transforming module 30; a signal transforming control pin P5 connected to the signal transforming pin Start; a plurality of display control pins P6-P8; a power source pin VCC2; a ground pin GND2; and two oscillatory signal input terminals XTAL1, XTAL2 connected to a power source VS via a crystal oscillator Y1. The frequency value of the crystal oscillator J3 is about 3.57 Mega Hertz (MHz).

The display unit 60 includes a plurality of data receiving pins D1-D8 connected to the second data transmitting pins N1-N8 of the main control circuit 50; a plurality of display pins RS, RW and E connected to the display control pins P6-P8 of the main control circuit 50; and a power source pin VCC3.

The power source pins VCC1, VCC2 and VCC3 of the signal transforming module 30, the main control circuit 50, and the display unit 60 are coupled to a power source VS, so as to provide working voltages to the signal transforming module 30, the main control circuit 50, and the display unit 60.

In use, the VID module 10, the signal transforming module 30, the main control circuit 50, and the display unit 60 are connected as illustrated in FIG. 2. The main control circuit 50 selects different address pins ADD1-ADD3 via the control pins P1-P3, to cause the data collecting pins IN0-IN7 of the signal transforming module 30 to read the voltage signals at different VID pins VID0-VID7 of the VID module 10 one by one.

Then, the signal transforming control pin P5, of the main control circuit 50, sends a command to the signal transforming pin Start; thereby causing the signal transforming module 30 to transform each voltage signal to a group of binary data, and send the group of binary data to the main control circuit 50 via the signal output pins O1-O8 in a parallel transmitting manner. The main control circuit 50 compares the group of binary data with the reference group of binary data and determine the binary level code of the group of the binary data. After the signal transforming module 30 finishes collecting all of the voltage signals of the VID module pins VID0-VID7, the main control circuit 50 gets a binary level code combination. Then, the main control circuit 50 determines an actual voltage value of the binary level code combination according to a relationship between the reference binary code level combination and corresponding voltage values preset in the main control circuit 50.

An example is illustrated to set forth the above descriptions in detail. For example, the group of reference binary data preset in the main control circuit 50 is 00001000. The signal transforming module 30 collects the voltage signal of the VID module pin VID0 and transforms the voltage signal to a first group of binary data 00000101. The first group of binary data 00000101 is smaller than the group of reference binary data 00001000. Thus the main control circuit 50 determines the first group of binary data is low level, and decrypts the first group of binary data to a binary level code "0". The signal transforming module 30 continue to collect the voltage signals of the other VID module pins VID1-VID7 one by one, and transform the voltage signals to eight corresponding groups of binary data. The main control circuit 50 determines the binary level codes of these groups of binary data respectively. Each voltage signal of each VID module pin corresponds to a binary level code. If one group of binary data is greater than the group of reference binary data, the group of binary data will be determined as high level and be decrypted to a binary level code "1". After all of the voltage signals are decrypted to corresponding binary level codes, the main control circuit 50 may construct the level codes to a binary level code combination, such as 10011100. Then, the main control circuit 50 finds an actual voltage value, such as 1.3V, which corresponds to the level code combination 10011100, from the database, according to a corresponding relationship between the reference level code combinations and the voltage values.

Figure 3:
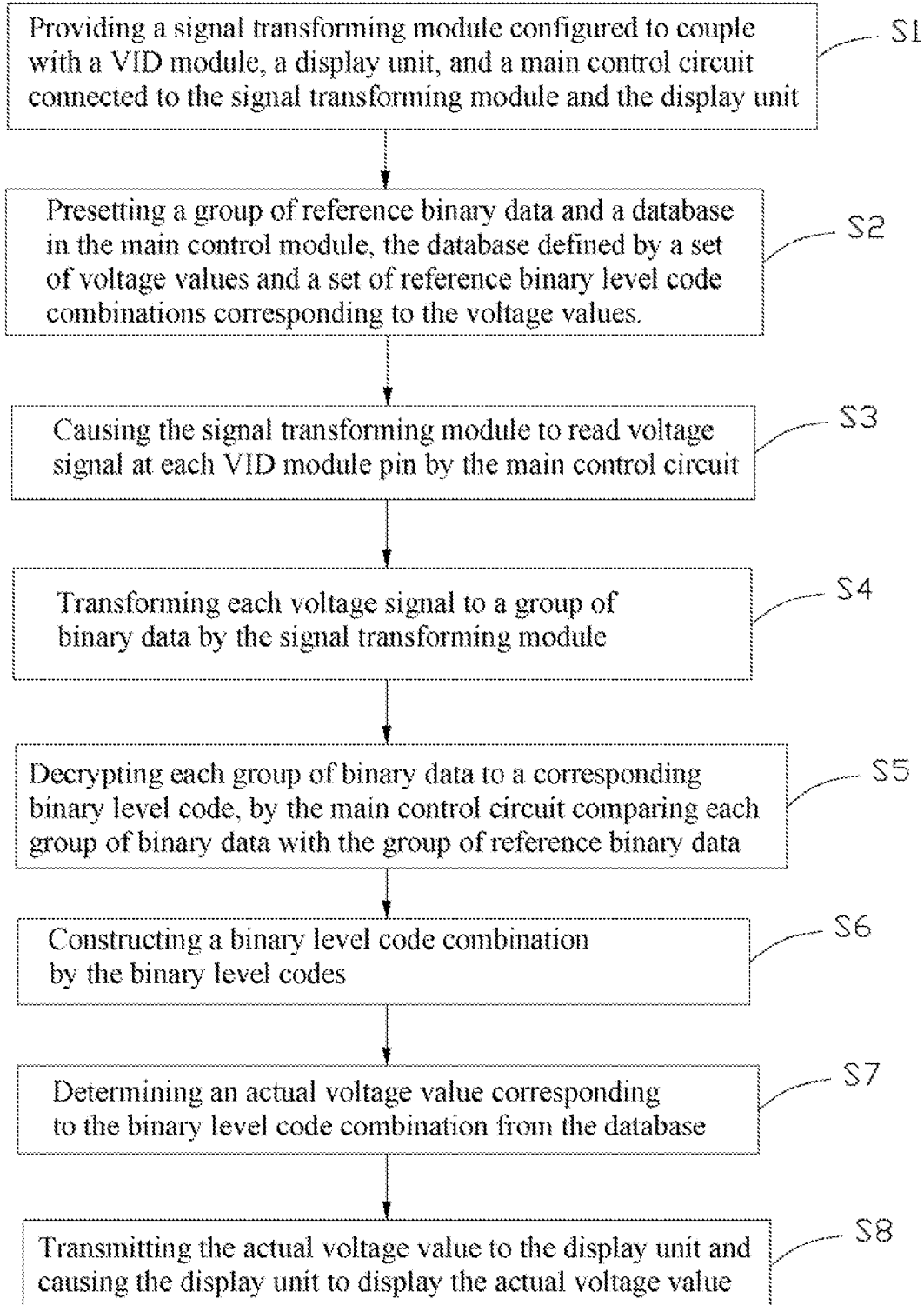
FIG. 3 is a flowchart of one embodiment of a detecting method for a VID module utilized by a detecting device such as, for example, that of FIG. 1.

Referring also to FIG. 3, one embodiment of a method for detecting voltage value of the VID module 10 is described as follows:

In step 01, providing a signal transforming module configured to couple with the VID module, a display unit, and a main control circuit connected to the signal transforming module and the display unit.

In step 02, presetting a group of reference binary data and a database in the main control module, the database defined by a set of voltage values and a set of reference binary level code combinations corresponding to the voltage values.

In step 03, causing the signal transforming module to read voltage signal at each VID module pin by the main control circuit.

In step 04, transforming each voltage signal to a group of binary data by the signal transforming module.

In step 05, decrypting each group of binary data to a corresponding binary level code, by the main control circuit comparing each group of binary data with the group of reference binary data.

In step 06, constructing a binary level code combination by the binary level codes.

In step 07, determining an actual voltage value corresponding to the binary level code combination from the database, by the main control circuit finding the corresponding relationship between the reference binary level code combinations and the voltage values.

In step 08, transmitting the actual voltage value to the display unit and causing the display unit display the actual voltage value.

It is to be understood, however, that even though numerous characteristics and advantages of the embodiments have been set forth in the foregoing description, together with details of the structure and function of the present disclosure, the disclosure is illustrative only, and changes may be made in detail, especially in matters of shape, size, and arrangement of parts within the principles of the embodiments to the full extent indicated by the broad general meaning of the terms in which the appended claims are expressed.

Depending on the embodiment, certain of the steps of methods described may be removed, others may be added, and the sequence of steps may be altered. It is also to be understood that the description and the claims drawn to a method may include some indication in reference to certain steps. However, the indication used is only to be viewed for identification purposes and not as a suggestion as to an order for the steps.

What is claimed is:

1. A voltage detecting device for measuring voltage value of a Voltage Identification (VID) module on a motherboard, the VID module having a plurality of VID module pins, the voltage detecting device comprising:
    a signal transforming module comprising a plurality of signal collecting pins connected to the plurality of VID module pins for collecting voltage signal from the VID module, a plurality of address pins, and a plurality of signal output pins; and
    a main control circuit comprising a plurality of first data transmitting pins connected to the plurality of signal output pins for receiving signals from the signal transforming module, a plurality of control pins connected to the plurality of address pins for selecting different ones of the plurality of VID module pins according to different address signals; the main control circuit capable of causing the signal transforming module to read voltage signal at each VID module pin, transforming each voltage signal to a group of binary data, decrypting each group of binary data to a corresponding binary level code, constructing a binary level code combination, and determining actual voltage value corresponding to the binary level code combination.

2. The voltage detecting device of claim 1, wherein the signal transforming module is capable of sending the groups of binary data to the first data transmitting pins via parallel data transmitting.

3. The voltage detecting device of claim 1, wherein a group of reference binary data is preset in the main control circuit; and the main control circuit is capable of decrypting the groups of binary data to corresponding binary level codes by comparing each group of binary data with the group of reference binary data.

4. The voltage detecting device of claim 3, wherein a set of voltage values and a set of reference binary level code combinations are preset in the main control circuit, and each reference binary level code combination corresponds to a voltage value; the main control circuit is capable of determining the voltage value of the VID module according to the corresponding relationship between the reference binary level code combinations and the voltage values.

5. The voltage detecting device of claim 1, further comprising a display unit connected to the main control circuit, and the main control circuit capable of sending the voltage value to the display unit.

6. The voltage detecting device of claim 5, wherein the main control circuit comprises a plurality of second data transmitting pins and a plurality of display control pins coupled to the display unit, so as to control the display unit receive the voltage value and display.

7. A voltage detecting method for measuring voltage value of a Voltage Identification (VID) module on a motherboard, the VID module having a plurality of VID module pins, and the voltage detecting method comprising:
    providing a signal transforming module coupled with the VID module, and a main control circuit coupled to the signal transforming module;
    causing the signal transforming module to read voltage signal at each VID module pin by the main control circuit;
    transforming each voltage signal to a first group of binary data by the signal transforming module;
    comparing the first group of binary data with a group of reference binary data preset in the main control circuit;
    decrypting the first group of binary data to a corresponding binary level code according to the comparing result;
    constructing a second group of binary data by combining the binary level codes of the plurality of VID module pins; and
    determining an actual voltage value corresponding to the binary level code combination by the main control circuit.

8. The voltage detecting method of claim 7, wherein the signal transforming module comprises a plurality of address pins, and the main control circuit comprises a plurality of control pins corresponding to and connected to the address pins; and the main control circuit selects different address pins to cause the signal transforming module to read the voltage signal at the different VID module pins.

9. The voltage detecting method of claim 7, wherein the signal transforming module sending the groups of binary data to the main control circuit via parallel data transmitting.

10. The voltage detecting method of claim 7, further comprising presetting a set of voltage values and a set of reference binary level code combinations in the main control circuit, and each reference binary level code combination corresponds to a voltage value.

11. The voltage detecting method of claim 10, further comprising determining the voltage value of the VID module by the main control circuit finding the corresponding relationship between the reference binary level code combinations and the voltage values.

12. The voltage detecting method of claim 7, further comprising sending the actual voltage value to a display unit and causing the display unit to display the voltage value of the VID module by the main control circuit.

13. The voltage detecting method of claim 7, wherein when the first group of binary data is less than the group of reference binary data, the first group of binary data to decrypted to a binary level code "0"; when the first group of binary data is greater than the group of reference binary data, the first group of binary data to decrypted to a binary level code "1".

* * * * *